United States Patent
Petrany et al.

(10) Patent No.: US 11,200,523 B2
(45) Date of Patent: Dec. 14, 2021

(54) SYSTEM AND METHOD FOR MANAGING TOOLS AT A WORKSITE

(71) Applicant: Caterpillar Inc., Deerfield, IL (US)

(72) Inventors: Peter Joseph Petrany, Dunlap, IL (US); Jeremy Lee Vogel, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 146 days.

(21) Appl. No.: 16/459,381

(22) Filed: Jul. 1, 2019

(65) Prior Publication Data

US 2021/0004744 A1 Jan. 7, 2021

(51) Int. Cl.
*G06Q 10/06* (2012.01)
*G07C 5/00* (2006.01)
*G06Q 50/08* (2012.01)

(52) U.S. Cl.
CPC ... *G06Q 10/06313* (2013.01); *G06Q 10/0633* (2013.01); *G06Q 50/08* (2013.01); *G07C 5/008* (2013.01)

(58) Field of Classification Search
CPC ......... G06Q 10/06313; G06Q 10/0633; G06Q 50/08; G07C 5/00; G07C 5/008
USPC ...................................................... 705/7.13
See application file for complete search history.

(56) References Cited

U.S. PATENT DOCUMENTS

| | | | |
|---|---|---|---|
| 5,612,864 A | 3/1997 | Henderson | |
| 7,911,379 B2 | 3/2011 | Cameron | |
| 9,938,693 B1 | 4/2018 | Reed et al. | |
| 10,011,976 B1* | 7/2018 | Forcash | E02F 3/96 |
| 2009/0279741 A1* | 11/2009 | Susca | G06T 7/246 |
| | | | 382/107 |
| 2012/0249342 A1* | 10/2012 | Koehrsen | G08G 1/16 |
| | | | 340/904 |
| 2013/0113929 A1 | 5/2013 | DeLand | |

(Continued)

FOREIGN PATENT DOCUMENTS

WO 2008079192 7/2008

OTHER PUBLICATIONS

Personnel tracking on construction sites using video cameras. J. Teizerand P.A. Vela. Advanced Engineering Informatics. 23 (2009) 452-462.*

(Continued)

*Primary Examiner* — Timothy Padot
(74) *Attorney, Agent, or Firm* — Lee & Hayes, PLLC

(57) ABSTRACT

A method receiving image information with one or more processor(s) and from a sensor disposed at a worksite and determining an identity of a work tool disposed at the worksite based at least partly on the image information. The method further includes receiving location information with the one or more processor(s), the location information indicating a first location of the sensor at the worksite. Additionally, the method includes determining a second location of the work tool at the worksite based at least partly on the location information. In some instances, the method includes generating a worksite map with the one or more processor(s), the worksite map identifying the work tool and indicating the second location of the work tool at the worksite, and at least one of providing the worksite map to an additional processor and causing the worksite map to be rendered via a display.

15 Claims, 5 Drawing Sheets

(56) References Cited

U.S. PATENT DOCUMENTS

| 2014/0195396 A1* | 7/2014 | Bhakta | G06Q 40/02 |
| | | | 705/35 |
| 2016/0110878 A1* | 4/2016 | Chang | G06K 9/00791 |
| | | | 382/103 |
| 2016/0292933 A1* | 10/2016 | Sprock | G07C 5/008 |
| 2016/0312432 A1* | 10/2016 | Wang | E02F 9/2012 |
| 2017/0248439 A1 | 8/2017 | Sakai et al. | |
| 2018/0325032 A1 | 11/2018 | Rotole et al. | |

OTHER PUBLICATIONS

Autonomous mining equipment years ahead of car development. Lecklider, Tom. EE—Evaluation Engineering 56.3: 28(1). NP Communications, LLC. (Mar. 2017).*

Shelley, Anthony N., "Incorporating Machine Vision in Precision Dairy Farming Technologies" (2016). Theses and Dissertations—Electrical and Computer Engineering. Paper 86.*

\* cited by examiner

SYSTEM AND METHOD FOR MANAGING TOOLS AT A WORKSITE

TECHNICAL FIELD

The present disclosure relates to a system and method for managing a worksite, such as work tools at a worksite. More specifically, the present disclosure relates to a system including one or more sensors coupled to a machine configured to determine a location or characteristic associated with a work tool.

BACKGROUND

Haul trucks, wheel loaders, skid steer loaders, dozers, and other machines are often used to perform a variety of construction or mining tasks at a worksite. The machines may use a variety of components and attachments, for instance, to remove or add gravel, concrete, asphalt, soil, or other material making up part of a work surface at the worksite, receive, measure and cut materials, and build structures. Multiple work tools may move to multiple locations of a worksite during a construction or mining project because the work tools may be used by different machines at different locations during different stages of the operation.

In some instances, a construction company may operate many machines with hundreds, or even thousands, of work tools distributed throughout multiple worksites. Managing the locations and statuses of the work tools at the multiple sites can be complicated by frequent and unreported work tool location changes. Additionally, regularly relocated work tools may become dispersed throughout the worksite and may be difficult to detect by operators of machines or autonomous machines traversing the worksite, creating a safety hazard.

Example systems and methods for tracking instruments or tools with one or more cameras are described in U.S. Patent Application Publication No. 2013/0113929 (hereinafter referred to as the '929 Publication). In particular, the '929 Publication describes systems and methods for overcoming the difficulty of maintaining an accurate count of surgical instruments in an operating room. As explained in the '929 Publication, an example surgical tray camera positioned so that all of the surgical instruments placed on a surgical tray are within view of the camera. Such a surgical tray camera may include multiple imaging devices, and the camera described in the '929 Publication may be configured to form a 3D representation of the surgical instruments on the surgical tray based on information received from the respective imaging devices.

While the system described in the '929 reference may be configured for use in a medical operating room environment, the relatively small fixed-position cameras described in the '929 reference would be ill-suited to determine the identity and/or location of work tools in mining, paving, construction, and/or other worksites. For instance, area encompassed by such worksites is typically orders of magnitude larger than the relatively confined space monitored by such fixed-position cameras. Further, the respective locations of the work tools typically employed at such worksites change frequently throughout the course of a workday, making monitoring their location with the fixed-position camera described in the '929 reference untenable.

Example embodiments of the present disclosure are directed toward overcoming the deficiencies described above.

SUMMARY

In an example embodiment of the present disclosure, a method includes receiving image information with one or more processor(s) and from a sensor disposed at a worksite and determining an identity of a work tool disposed at the worksite based at least partly on the image information. The method includes receiving location information with the one or more processor(s), the location information indicating a first location of the sensor at the worksite, and determining a second location of the work tool at the worksite based at least partly on the location information. The method further includes generating a worksite map with the one or more processor(s), the worksite map identifying the work tool and indicating the second location of the work tool at the worksite and at least one of providing the worksite map to an additional processor and causing the worksite map to be rendered via a display.

In another example embodiment of the present disclosure, a system includes a machine adapted to perform operations at a worksite; a sensor adapted to determine image information associated with the worksite; and one or more processor(s). Such one or more processor(s) are adapted to determine a tool characteristic associated with a work tool disposed at the worksite, based at least partly on the image information; determine a first location associated with the work tool based at least in part on a second location of the machine; generate a worksite map identifying the work tool and indicating the location associated with the work tool; and at least one of providing the worksite map to an additional processor and causing the worksite map to be rendered via a display.

In yet another example embodiment of the present disclosure a method includes receiving, with a processor and from at least one sensor of a first machine, a first indicator identifying a location associated with a work tool at a worksite; and a second indicator identifying a tool characteristic associated with the work tool. The method further includes determining, with the processor, that a second machine is traveling a first path that is within a predetermined threshold distance of the location; and sending, to the second machine, with the processor, and based at least in part on determining that the second location is traveling the path that is within the predetermined threshold distance of the location, a third indicator. Such a third indicator identifies the location of the work tool, and is executable to cause the second machine to travel a second path that is different than the first path.

DETAILED DESCRIPTION

Figure 1:
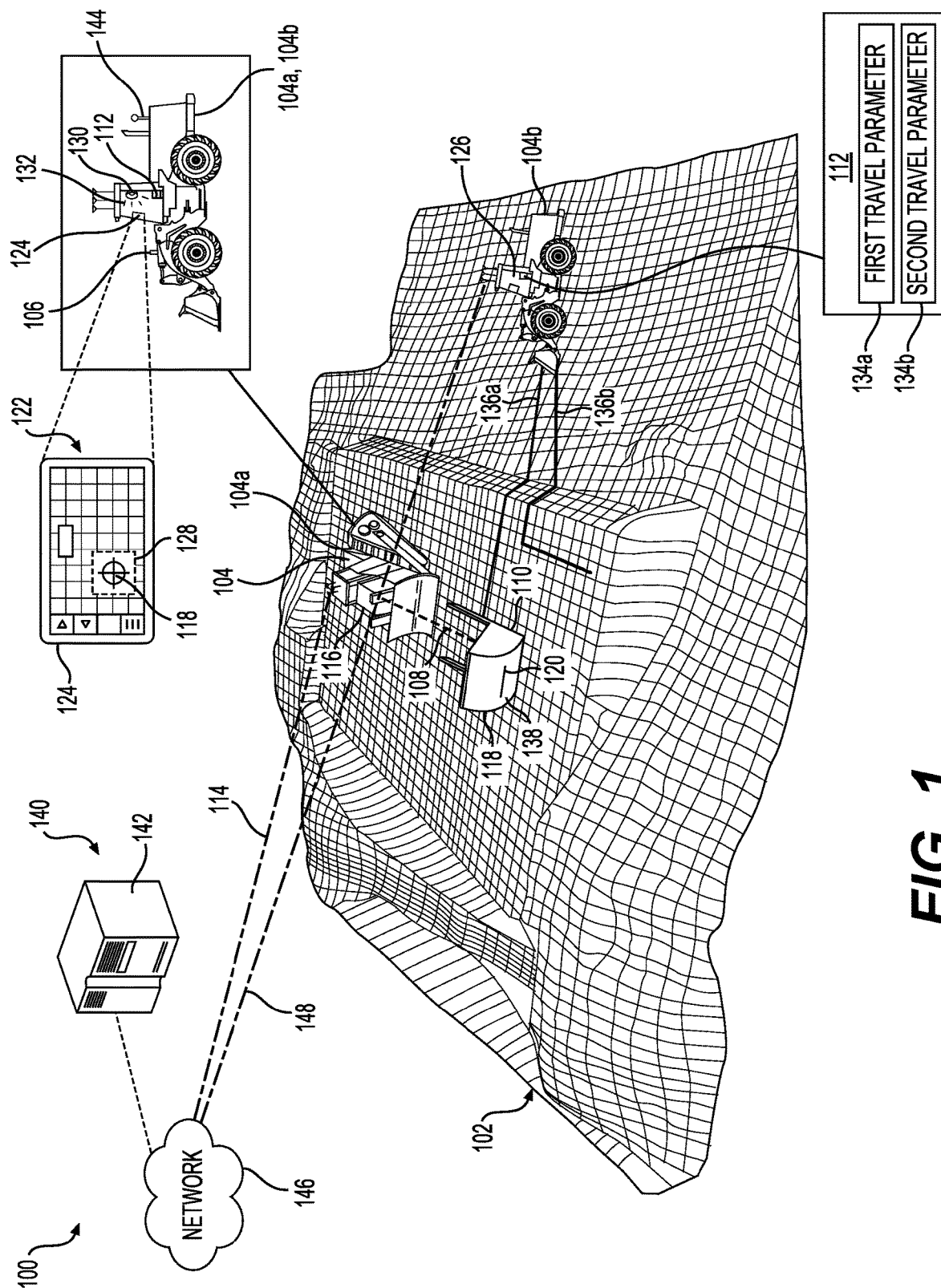
FIG. 1 is a schematic illustration of a system in accordance with an example embodiment of the present disclosure.

Wherever possible, the same reference numbers will be used throughout the drawings to refer to the same or like parts. Referring to FIG. 1, an example system 100 may operate in an environment of a worksite 102 (e.g., a construction worksite, a paving worksite, a mining worksite, etc.) with one or more machine(s) 104, such as a first machine(s) 104(a), a second machine(s) 104(b), and so on (collectively referred to herein as machine(s) 104), performing mining, paving, and/or construction operations at the worksite 102. The system 100 may include a sensor 106 for collecting image information 108, for instance, from a work tool 110. One or more processor(s) 112 may be located at the worksite 102, for instance, carried by at least one of the machines 104, to receive, analyze, and/or send information, such as location information 114 which may indicate a first location 116 of the machine(s) 104 and/or a second location 118 associated with the work tool 110.

In some examples, the system 100 may determine (e.g., with the sensor 106 and the one or more processor(s) 112) a tool characteristic 120 associated with the work tool 110. The system 100 may generate a worksite map 122 identifying the work tool 110, for instance, via the tool characteristic 120 (e.g., a work tool identifier), and indicating the second location 118 of the work tool 110 at the worksite 102. In some instances, the worksite map 122 may be displayed at a display 124 (e.g., a monitor) that may be located at the worksite 102, for instance, in a cabin 126 of the machine(s) 104. The worksite map 122 may include a visual representation of a boundary 128 positioned at least partially around the second location 118. An audio speaker 130 may be located at the worksite 102, for instance, carried by the machine(s) 104, and may generate an audio output 132, at least partially based on the image information 108, and indicating at least a proximity of the machine(s) 104 to the second location 118 of the work tool 110.

In some instances, the processor 112 may determine a first travel parameter 134a that may cause the machine(s) 104 to travel along a first travel path 136a at the worksite 102. The processor 112 may determine a second travel parameter 134b at least partly based on the image information 108 and/or the second location 118. The second travel parameter 134b may cause the machine(s) 104 to travel along a second travel path 136b that may be different than the first travel path 136a.

In some examples, the image information 108 may be received at the sensor 106 upon directing the sensor 106 at the work tool 110 and receiving light reflecting from a surface 138 of the work tool 110. Information generated based at least partly on the image information 108 (e.g., the worksite map 122 or one or more indicators of the second location 118 and/or the tool characteristic 120) may be sent to a remote control system 140 that may include an additional processor 142. For instance, a communication device 144 carried by the machine(s) 104 may transmit information to the remote control system 140 via a network 146 and/or one or more transmission(s) 148 of the communication device 144 to the remote control system 140 through the network 146.

With continued reference to FIG. 1, in some examples the system 100 may operate at the worksite 102 which may comprise a construction site, a mining site, or combinations thereof. For instance, the worksite 102 may span thousands of square feet, acres, or even miles.

The machine(s) 104 may comprise, in some instances, one or more digging machines, one or more loading machines, one or more hauling machines, one or more transport machines, and/or other types of machines used for construction, mining, paving, excavation, and/or other operations at the worksite 102. Each of the machines 104 described herein may be in communication with each other and/or with a local control system or the remote control system 140 by way of the one or more processor(s) 112. The one or more processor(s) 112 may facilitate wireless communication between the machines 104 described herein and/or between such machines 104 and, for example, one or more other machines 104, for the purpose of transmitting and/or receiving operational data and/or instructions.

The machine(s) 104 may comprise a digging machine that reduces material at the worksite 102 for the purpose of subsequent operations (i.e., for blasting, loading, hauling, and/or other operations). Examples of digging machines may include excavators, backhoes, dozers, drilling machines, trenchers, drag lines, etc. Multiple digging machines may be co-located within a common area at the worksite 102 and may perform similar functions. For example, one or more of the digging machines may move soil, sand, minerals, gravel, concrete, asphalt, overburden, and/or other material comprising at least part of a work surface of the worksite 102. As such, multiple digging machines may share multiple attachments during various stages of the project, such as the one or more work tools 110.

The machine(s) 104 may comprise a loading machine that lifts, carries, loads, and/or removes material that has been reduced by one or more of the digging machines. In some examples, the machine(s) 104 may remove such material, and may transport the removed material from a first location at the worksite 102 to a second location at the worksite 102. Examples of the machine(s) 104 may include a wheeled or tracked loader, a front shovel, an excavator, a cable shovel, a stack reclaimer, or any other similar machine(s) 104. One or more loading machines may operate within common areas of worksite 102 to, for example, load reduced materials onto a hauling machine. As such, multiple loading machines may share multiple attachments during various stages of the project, such as the one or more work tools 110.

In any of the examples described herein, one or more of the machine(s) 104 of the system 100 may be manually controlled, semi-autonomously controlled, and/or fully-autonomously controlled. In examples in which the machine(s) 104 of the system 100 are operating under autonomous or semi-autonomous control, the speed, steering, work tool positioning/movement, and/or other functions of such machines 104 may be controlled automatically or semi-automatically based at least in part on determining travel parameters (e.g., the first travel parameter 134a, the second travel parameter 134b, etc.).

In some examples, the sensor 106 may be carried by the machine(s) 104 (e.g., as a fixture of the machine(s) 104 and/or as a detachable accessory of the machine(s) 104) and/or the sensor 106 may be positioned at other locations of the worksite 102, such as attached to a light pole, attached to a side of a building (e.g., a local office), carried on construction personnel, attached to a fence, etc. In some examples, one or more of the sensor 106, the communication device 144, the display 124, and/or the audio speaker 130 may be fixed to the cab, chassis, frame, and/or any other component of the respective machine(s) 104. In other examples, however, one or more of the sensor 106, the communication device 144, the display 124, and/or the audio speaker 130 may be removably attached to the respective machine(s) 104 and/or disposed within, for example, the cab of such a machine(s) 104 during operation.

In some instances, the sensor 106 may include at least a perception sensor configured to determine the one or more tool characteristic(s) 120. For instance, the sensor 106 may be configured to sense, detect, observe, and/or otherwise determine various characteristic of the surface 138 of the work tool 110.

In some examples, the sensor 106 may comprise the perception sensor that may include a single sensor and/or other component of a local perception system disposed on the machine(s) 104. In other examples, the perception sensor may comprise a plurality of like or different sensors, each of which comprises a component of such a local perception system disposed on the machine(s) 104. For example, the perception sensor may comprise, among other things, a light sensor, a camera, or other image capture device. Such a sensor 106 may be any type of device configured to capture images representative of the work tool 110, the surface 138 of the work tool 110, a background behind the work tool 110, the worksite 102, and/or other environments within a field of view of the sensor 106.

In some examples, the sensor 106 may comprise the light sensor, such as one or more cameras (e.g., RGB-cameras, monochrome cameras, intensity (grey scale) cameras, infrared cameras, ultraviolet cameras, depth cameras, stereo cameras, etc.). Such a sensor 106 may be configured to receive the image information 108 representing, for example, a length, width, height, depth, volume, color, texture, composition, radiation emission, combinations thereof, and/or other tool characteristics 120 of one or more objects, such as the work tool 110, within the field of view of the sensor 106. For instance, such tool characteristics 120 may also include one or more of an x-position (global position coordinate), a y-position (global position coordinate), a z-position (global position coordinate), an orientation (e.g., a roll, pitch, yaw), an object type (e.g., a classification), a velocity of the object, an acceleration of the object, etc. It is understood that one or more such tool characteristics 120 (e.g., a location, a dimension, a volume, etc.) may be determined by the sensor 106 comprising the image capture device alone or comprising a combination of an image capture device and a location sensor, described below. Tool characteristics 120 associated with the work tool 10 and/or the surface 138 of the work tool 110 may also include, but are not limited to, a work tool identifier, a work tool model, a work tool type, and/or a work tool history, as discussed in greater detail below regarding FIG. 2.

In some examples, the sensor 106, such as the image capture device and/or other components of the perception sensor, may also be configured to provide one or more signals to the one or more processor(s) 112 including the image information 108 (e.g., a voltage signal representing the image information 108) or other sensor information captured thereby. Such image information 108 may include, for example, a plurality of images captured by the sensor 106 and indicative of various tool characteristics 120 of the work tool 110 within the field of view of the sensor 106. In such examples, the one or more processor(s) 112 and/or the additional processor 142 may analyze the image information 108 to determine the second location 118 and/or the tool characteristic 120, as discussed in greater detail below.

In some instances, the sensor 106 (e.g., the perception sensor and/or the local perception system) may be carried by the machine(s) 104 and may also include a light detection and ranging (hereinafter, "LIDAR") sensor. Such a LIDAR sensor may include one or more lasers or other light emitters carried by (e.g., mounted on, connected to, etc.) the machine(s) 104, as well as one or more light sensors configured to receive radiation radiated, reflected, and/or otherwise returned by an object onto which light from such light emitters has been impinged. In example embodiments, such a LIDAR sensor may be configured such that the one or more lasers or other light emitters are mounted to spin (e.g., about a substantially vertical axis), thereby causing the light emitters to sweep through, for example, a 360 degree range of motion, to capture LIDAR sensor data associated with a work tool 110, the surface 138 of the work tool 110, and/or the worksite 102, generally. For example, a LIDAR sensor of the present disclosure may have a light emitter and a light sensor, with the light emitter including one or more lasers that direct highly focused light toward an object or surface, which reflects the light back to the light sensor, though any other light emission and detection to determine range is contemplated (e.g., flash LIDAR, MEMS LIDAR, solid state LIDAR, and the like). Measurements of such a LIDAR sensor may be represented as three-dimensional LIDAR sensor data having coordinates (e.g., Cartesian, polar, etc.) corresponding to positions or distances captured by the LIDAR sensor. For example, three-dimensional LIDAR sensor data and/or other sensor information received from the LIDAR sensor may include a three-dimensional map or point cloud, which may be represented as a plurality of vectors emanating from a light emitter and terminating at an object (e.g., the surface 138 of the work tool). In some examples, converting operations may be used by the one or more processor(s) 112 and/or by the additional processor 142 to convert the three-dimensional LIDAR sensor data to multi-channel two-dimensional data. In some examples, the LIDAR sensor data and/or other image information 108 received from the sensor 106 may be automatically segmented by the one or more processor(s) 112 and/or by the additional processor 142, and the segmented LIDAR sensor data may be used, for example, as input for determining trajectories, travel paths 114, travel speeds, and/or other travel parameters (e.g., the first travel parameter 134a and/or the second travel parameter 134b) of the machines 104 described herein.

In some examples, the sensor 106 may comprise a radio detection and ranging (hereinafter, "RADAR") sensor, a sound navigation and ranging (hereinafter, "SONAR") sensor, a depth sensing camera, a ground-penetrating RADAR sensor, a magnetic field emitter/detector, and/or other sensors, for instance, disposed on the machine(s) 104 and configured to detect objects such as the work tool 110 present in the worksite 102. Each of the sensors described herein may output one or more respective signals to the one or more processor(s) 112 and/or to the additional processor 142, and such signals may include any of the sensor information described above (e.g., image data, LIDAR data, RADAR data, SONAR data, GPS data, etc.). Such sensor information may be captured simultaneously by a plurality of the sensors 106, and in some instances, the sensor information received from the sensor(s) 106 (e.g., the image information 108) may include, identify, and/or be indicative of one or more tool characteristics 120 of the work tool 110.

In some examples, the sensor 106 may comprise at least a location sensor configured to determine a location, speed, heading, and/or orientation of the machine(s) 104. In such embodiments, the communication device 144 of the machine(s) 104 may be configured to generate and/or transmit signals indicative of such determined locations, speeds, headings, and/or orientations to, for example, one or more processor(s) 112 of other machines 104 of the system 100, to the local control system, and/or to the additional processor 142 of the remote control system 140. In some examples, the location sensors of the respective machines 104 may include and/or comprise a component of global navigation satellite system (GNSS) or a global positioning system (GPS). Alternatively, universal total stations (UTS) may be utilized to locate respective positions of the machines. In example embodiments, one or more of the location sensors described herein may comprise a GPS receiver, transmitter, transceiver, laser prisms, and/or other such device, and the location sensor may be in communication with one or more GPS satellites and/or UTS to determine a respective location of the machine(s) 104 to which the location sensor is connected continuously, substantially continuously, or at various time intervals. One or more additional machines 104 of the system 100 may also be in communication with the one or more GPS satellites and/or UTS, and such GPS satellites and/or UTS may also be configured to determine respective locations of such additional machines 104. In some examples, the system 100 may receive the location information 114 indicating the first location 116 of the machine(s) 104 from the sensor 106 (e.g., a GPS sensor). In any of the examples described herein, machine locations, speeds, headings, orientations, and/or other parameters determined by the respective location sensors may be used by the one or more processor(s) 112 and/or other components of the system 100 to determine the first location 116 of the machine(s) 104 and/or the second location 118 of the work tool 110.

In some examples, the sensor 106 may sense at least part of a travel path, such as the first travel path 136a, before the machine(s) 104 traverses the travel path and/or while the machine(s) 104 is controlled to traverse the travel path, for instance, by determining the first travel parameter 134a that corresponds to the first travel path 136. The sensor 106 may also determine and provide corresponding sensor information indicating the first location 116 of the machine(s) 104. In such examples, the one or more processor(s) 112 may receive the sensor information included in the one or more signals provided by the sensor 106. In some examples, the sensor information provided by the sensor 106 may be timestamped and/or otherwise marked with metadata such that a correspondence between the sensor information (e.g., the image information 108) can be identified by the one or more processor(s) 112. The image information 108 is discussed in greater detail below regarding FIG. 2.

The one or more work tools 110 may be positioned at various locations throughout the worksite 102. The work tool(s) 110 may, in some instances, be removably couplable to a frame of the machine(s) 104. For example the work tool 110 may comprise a bucket configured to carry material within an open volume or other substantially open space thereof. In some examples, the work tool 110 may comprise at least one of an adapter, an auger, a backhoe, a bale grab, a bale spear, a blade, a broom, a brushcutter, a bucket (e.g., a backhoe front bucket, a backhoe rear bucket, a compact wheel loader, an excavator, a loader, a mining shovel, a skid steer loader, a telehandler, etc.), a cold planer, a compactor, a coupler (e.g., for a backhoe rear, for an excavator, or for a loader), a delimber, a felling head, a flail mower, a fork, a grapple, a hammer, a harvester head, a material handling arm, a mulcher, a cutter jaw, a demolition jaw, a pulverizer jaw, a rake, a ripper, a rotor, a saw, a pair of shears, a silage defacer, a snow blower, a snow plow, a snow push, a stump grinder, a thumb, a winch, a power generator, a portion of a water delivery system, or combinations thereof.

In some instances, the one or more processor(s) 112 may form at least a portion of a controller that may be communicatively coupled to one or more computer-readable storage media. For instance, the one or more processor(s) 112 may include an electronic processor that operates in a logical fashion to perform operations, execute control algorithms, store and retrieve data and other desired operations. The one or more processor(s) 112 may include or access the computer-readable storage media (e.g., memory), secondary storage devices, other processors (e.g., the additional processor 142), and any other components for running an application. The memory and secondary storage devices may be in the form of read-only memory (ROM) or random access memory (RAM) or integrated circuitry that is accessible by the one or more processor(s) 112. Various other circuits may be associated with the one or more processor(s) 112 such as power supply circuitry, signal conditioning circuitry, driver circuitry, and other types of circuitry.

In some examples, the one or more processor(s) 112 may include a single processor or may include more than one processor configured to control various functions and/or features of the system 100, for instance, of the machine(s) 104 or the local control system. As used herein, the term "one or more processor(s)" is meant in its broadest sense to include one or more processor(s) 112, processors, central processing units, and/or microprocessors that may be associated with the system 100, and that may cooperate in controlling various functions and operations of the machines 104 and other components included in the system 100. The functionality of the one or more processor(s) 112 may be implemented in hardware and/or software without regard to the functionality. The one or more processor(s) 112 may rely on one or more data maps, look-up tables, neural networks, algorithms (e.g., machine-learning algorithm(s) 206 discussed in greater detail below regarding FIG. 2), and/or other components relating to the operating conditions and the operating environment of the system 100 that may be stored in the memory accessible by the one or more processor(s) 112. Each of the data maps noted above may include a collection of data in the form of tables, graphs, and/or equations to maximize the performance and efficiency of the system 100 and its operation.

In some examples, the one or more processor(s) 112 may include components located remotely from the respective one of the machines 104, such as on any of the other machines 104 of the system 100, or at the local control system, or at the remote control system 140. Thus, in some examples the functionality of the one or more processor(s) 112 may be distributed so that certain functions are performed on the respective one of the machines 104 and other functions are performed remotely. In some examples, one or more processor(s) 112 may be carried by a respective machine(s) 104 and may enable autonomous and/or semi-autonomous control of the respective machine(s) 104 either alone or in combination with the remote control system 140.

In some instances, the one or more processor(s) 112 may determine the second location 118 associated with the work tool 110, for instance, based at least partly on the image information 108 and/or the location information 114 indicating the first location 116. For instance, the one or more processor(s) 112 at the worksite 102 (e.g., carried by the machine(s) 104) and/or the additional processor 142 of the remote control system 140 may determine that the work tool 110 is a number of feet or meters apart from the machine(s) 104 via a line-of-site detection with the sensor. In some instances, the system 100 may determine the second location 118 based at least partly on a difference between multiple frames of the image information 108, as discussed in greater detail below regarding FIG. 2.

In some examples, the system 100 (e.g., via the one or more processor(s) 112 carried by the machine(s) 104 and/or the remote control system 140) may determine the tool characteristic 120 associated with the work tool 110, for instance, based at least partly on the image information 108. The one or more processor(s) 112 may correlate the output of each sensor modality to a particular object stored in a memory. Using such data association, object recognition, and/or object characterization techniques, the output of each of the sensors described herein may be compared. Through such comparisons, and based at least partly on the sensor information received from the sensor 106, the one or more processor(s) 112 may identify one or more tool characteristics 120 associated with one or more work tools 110 located at the worksite 102. As noted above, the sensor 106 may include at least a perception sensor and a location sensor and corresponding sensor information received from both the perception sensor and the location sensor may be combined and/or considered together by the one or more processor(s) 112 in order to determine the identity, model, type, weight, dimension history, location, shape, volume, and/or other tool characteristics 120 of the work tools 110. In some instances, the tool characteristics 120 may comprise one or more positions of the work tool 110, a loading position, a carrying position, an unloading position, and/or any other position of the work tool 110 relative to a work surface and/or relative to a frame of the machine(s) 104. Further, in some examples, and depending on the accuracy and/or fidelity of the sensor information received from the various sensors associated with the perception sensor, the presence, location, orientation, identity, length, width, height, depth, and/or other tool characteristics 120 of work tool 110 identified by the one or more processor(s) 112 using first sensor information (e.g., LIDAR data) may be verified by the one or more processor(s) 112 using second sensor information (e.g., image data) obtained simultaneously with the first sensor information but from a different sensor or modality of the perception sensor. In some examples, the system 100 may comprise the machine-learning algorithm(s) (206 of FIG. 2) and/or a worksite tool database (210 of FIG. 2) to determine the tool characteristic 120, as discussed in greater detail below.

In some instances, the system 100 may generate the worksite map 122. The worksite map 122 may be generated at the machine(s) 104 and/or may be sent to the machine(s) 104 from the remote control system 140. The machine(s) 104 may render the worksite map 122 at the display 124 that may comprise the monitor 126 carried by the machine(s) 104, such as within the cabin of the machine(s) 104. Rendering the worksite map 122 may include rendering a graphical user interface at the display 124 that includes, among other things, information indicative of a terrain of the worksite 102, structures of the worksite 102, machine(s) 104 at the worksite 102, travel paths, travel speeds, orientations, and/or other travel parameters of the respective machines 104, the work tool 110 at the second location 118, the boundary 128, the tool characteristic 120 (e.g., via a label, icon, or other visual indicator), and various other information related to the system, the worksite 102, and/or the construction project or mining project of the worksite 102.

In some examples, displaying the worksite map 122 may include rendering visual representations of instructions, locations (e.g., GPS coordinates, UTS coordinates, etc.), and/or other information identifying a perimeter and/or the boundary 128 of at least a portion of the worksite 102, for instance, at least partially around the second location 118 of the work tool 110. In some instances, the audio speaker 130 may be located at the worksite 102, such as in the cabin of the machine(s) 104. The audio speaker 130 may generate the audio output 132 that may indicate the proximity of the machine(s) 104 to the work tool 110. For instance, the audio speaker 130 may generate the audio output 132 based on the one or more processor(s) 112 detecting that the first location 116 of the machine(s) 104 has crossed the boundary 128, or that the machine(s) 104 is traveling a travel path that intersects the boundary 128. Accordingly, the audio speaker 130 may generate the audio output 132 as an alert. In some examples, the alert may be a visual alert provided to an operator of the machine(s) 104, via a rendering on the display 124 of the machine(s) 104 disposed within the cab. Additionally or alternatively, the one or more processor(s) 112 may provide one or more such alerts to the one or more processor(s) 112, an electronic device utilized by a foreman at the worksite 102, one or more additional machines 104 of the system 100 disposed at the worksite 102, and/or to any other components of the system 100, such as the remote control system 140 via the network 146. Such alerts, which may be based on detecting the travel path (e.g., the first travel path 136*a*) intercepting the boundary 128 and/or the second location 118 associated with the work tool 110, may signal and/or cause one or more machines 104 to pause operation.

In some examples, the one or more processor(s) 112 may retrieve, access, and/or execute one or more travel parameters, such as the first travel parameter 134*a* and the second travel parameter 134*b*, to control movements of the machine(s) 104 about the worksite 102. For instance, the travel parameters may comprise input values to the one or more processor(s) 112 that cause the one or more processor(s) to move the machine along one or more travel paths (e.g., first travel path 136*a*, second travel path 136*b*, etc.). Such travel paths may include one or more partially or completely formed roads, bridges, tracks, paths, or other surfaces formed by the surface of the worksite 102 and passable by the construction, mining, paving machines, and/or other example machines 104 described herein. In other words, the machine(s) 104 may be configured to travel along, and/or otherwise traverse at least part of one or more travel paths formed on the surface of the worksite 102 in order to perform various tasks at the worksite 102. For example, a machine(s) 104 may be controlled (e.g., upon executing the first travel parameter 134*a*) to traverse the first travel path 136*a* from a first current location (e.g., a first location) of the machine(s) 104 to a first end location (e.g., a second location) of the worksite 102. The machine(s) 104 may receive an indication to determine the second travel parameter 134*b* (e.g., as discussed in greater detail regarding FIG. 3) and may, accordingly, traverse the second travel path 136*b* from a second current location (e.g., a third location) of the machine(s) 104 to a second end location (e.g., a fourth location) of the worksite 102.

In some examples, the sensor 106, such as the perception sensor carried by the machine(s) 104, may sense at least part of one or more of the travel paths described herein, and may direct corresponding signals to the one or more processor(s) 112 including sensor information associated with portions of the work surface defining the respective travel paths. In any of the examples described herein, the location sensor may also sense, detect, and/or otherwise determine the first location 116 of the machine(s) 104 simultaneously with the sensing operations performed by the perception sensor, and may direct corresponding signals to the one or more processor(s) 112 including sensor information indicating the first location 116 of the machine(s) 104. In some examples, the system 100 may determine that the machine(s) 104 may safely cross traverse along the travel paths described herein without causing damage to the machine(s) 104 and/or injury to an operator of the machine(s) 104. In such examples, the one or more processor(s) 112 may determine and/or control the machine(s) 104 to traverse a travel path (e.g., first travel path 136a, second travel path 136b, etc.). In some instances, the system 100 may cause the machine(s) 104 to travel along a travel path in order to maximize the efficiency of the machine(s) 104 as it performs tasks defined by a worksite plan. For example, the travel path may comprise a most direct route, a best-fit route, and/or other configuration in order to minimize the time and resources required for the machine(s) 104 to travel from the current location to the end location. In any of the examples described herein, one or more of the travel paths determined by the one or more processor(s) 112 may comprise a drive line disposed within a drive envelope. In such examples, the drive line may extend approximately centrally through the drive envelope, and the drive envelope may define at least part of the travel path along which the machine(s) 104 travels to reach a particular destination (e.g., the end location). For example, the drive envelope defining the travel path may be approximately as wide as the machine(s) 104, and in some examples the drive envelope and/or a substantially central drive line of the drive envelope may be used to determine, a trajectory and/or a series of sequential trajectories along which the machine(s) 104 may travel to achieve the desired travel path. Each trajectory of the series of sequential trajectories may be determined by substantially simultaneously generating a plurality of trajectories and selecting one of the trajectories which is best able to achieve the desired travel path. In such examples, respective trajectories, and the resulting travel path defined thereby, may be generated and/or otherwise determined by the one or more processor(s) 112 in accordance with a receding horizon technique and/or other travel path generation technique. Such a technique and/or other travel path generation techniques may utilize one or more algorithms, neural networks, look-up tables, three-dimensional maps, predictive models, and/or other components to generate at least part of the travel path. In some examples, GPS coordinates, UTS coordinates, and/or other location information or coordinates indicating the current location of the machine(s) 104 and the location of the desired destination (e.g., the end location) may be used by the one or more processor(s) 112 to generate a series of waypoints and/or a series of sequential trajectories corresponding to such waypoints. In such examples, the travel path may comprise a sequence of waypoints and/or trajectories leading from the current location (e.g., the first location 116) of the machine(s) 104 to the location of the desired destination (e.g., the end location).

In some examples, in generating one or more of the travel path described herein, the one or more processor(s) 112 may generate a plurality of sequential trajectories, and each trajectory may comprise a two-dimensional vector or a three-dimensional vector. Such trajectories may be linear trajectories determined using, for example, a linear algorithm (e.g., $Y=mX+b$) or some variation thereof in order to direct the machine(s) 104 from a current location to the end location. Additionally or alternatively, such trajectories may be curvilinear trajectories, or other trajectories determined using one or more corresponding algorithms. For example, the one or more processor(s) 112 may generate a curvilinear trajectory using one or more best-fit curve algorithms (e.g., a second degree polynomial equation: $Y=aX2+bX+c$; a third degree polynomial equation: $Y=aX3+bX2+cX+d$; etc.) or other techniques. Taken together, the sequential trajectories described above may make up one or more of the travel paths described herein (e.g., first travel path 136a, second travel path 136b, etc.). Further, in some examples the various trajectories determined by the one or more processor(s) 112 may be valid and/or useable by the one or more processor(s) 112 for controlling operation of the machine(s) 104 for a particular time window (e.g. less than 10 seconds) and/or may be recalculated at a certain frequency (e.g. 10 Hz, 30 Hz, etc.).

In some instances, the remote control system 140 may receive information from the worksite 102 via one or more transmission(s) 148 from one or more communication device(s) 144. The communication device(s) 144 may comprise a component of a wireless communication system of the system 100, and as part of such a wireless communication system, the machine(s) 104 of the system 100 may include respective communication devices 144. Such communication devices 144 may be configured to permit wireless transmission of a plurality of signals, instructions, and/or information (e.g., the transmission(s) 148) between the one or more processor(s) 112 of the machines 104 and other one or more processor(s) 112 of other machine(s) 104, of the local control system, and/or the additional processor 142 of the remote control system 140. Such communication devices 144 may also be configured to permit communication with other machines and systems remote from the worksite 102. For example, such communication devices 144 may include a transmitter configured to transmit signals (e.g., via the network 146) to a receiver of one or more other such communication devices 144. In such examples, each communication device 144 may also include a receiver configured to receive such signals (e.g., via the network 146). In some examples, the transmitter and the receiver of a particular communication device 144 may be combined as a transceiver or other such component. The communication device(s) 144 may be carried by the machine(s) 104 and/or may be positioned at other locations of the worksite 102, such as at the local control system. In any of the examples described herein, such communication devices 144 may also enable communication (e.g., via the remote control system 140 and over the network 146) with one or more tablets, computers, cellular/wireless telephones, personal digital assistants, mobile devices, or other electronic devices that may be located at the worksite 102 and/or remote from the worksite 102. Such electronic devices may comprise, for example, mobile phones and/or tablets of project managers (e.g., foremen) overseeing daily operations at the worksite 102.

The one or more transmissions 148, for instance, between the first machine(s) 104(a) and the remote control system 140, may include indicators of the first location 116 of the machine(s) 104, the second location 118 of the work tool 110, the tool characteristic 120 associated with the work tool 110, the worksite map 122, and/or combinations thereof. Communications between the first machine(s) 104(a), the second machine(s) 104(b) and the remote control system 140 via the one or more transmissions 148 are discussed in greater detail below regarding FIG. 3. In some examples, the communication device 140, for instance, of the first machine(s) 104(a), may communicate with and/or otherwise operably connect to the remote control system 140 and/or any of the components of the system 100 via a network 146. The network 146 may include a local area network ("LAN"), a larger network such as a wide area network ("WAN"), or a collection of networks, such as the Internet. Protocols for network communication, such as TCP/IP, Internet-of-Things protocols, and/or other communication systems may be used to implement the network 146. Although embodiments are described herein as using the network 146 such as the Internet, other distribution techniques may be implemented that transmit information via memory cards, flash memory, or other portable memory devices.

In some examples, the remote control system 140 may be located at a command center remote from the worksite 102 and the one or more processor(s) 112 and/or one or more components of a control system may be located at the worksite 102, such as at a local control system. Regardless of the location of the various components of the remote control system 140 and/or the local control system, such components may be configured to facilitate communications between, and to provide information to, the machine(s) 104 (e.g., 104(a), 104(b) . . . 104(n)) of the system 100. In any of the examples described herein, the functionality of the one or more processor(s) 112 may be distributed so that certain operations are performed at the worksite 102 and other operations are performed remotely (e.g., at the remote control system 140). It is understood that the one or more processor(s) 112 may comprise a component of the system 100, a component of one or more of the machines 104 disposed at the worksite 102, a component of a separate mobile device (e.g., a mobile phone, a tablet, a laptop computer, etc.), and/or the remote control system 140.

The network 146, communication devices 148, and/or other components of the wireless communication system described above may implement or utilize any desired system or protocol including any of a plurality of communications standards. The desired protocols will permit communication between the one or more processor(s) 112, one or more of the communication devices 144, and/or any machines 104 or components of the system 100. Examples of wireless communications systems or protocols that may be used by the system 100 described herein include a wireless personal area network such as Bluetooth® (e.g., IEEE 802.15), a local area network such as IEEE 802.11b or 802.11g, a cellular network, or any other system or protocol for data transfer. Other wireless communication systems and configurations are contemplated. In some instances, wireless communications may be transmitted and received directly between the remote control system 140 and the machine(s) 104 (e.g., a paving machine, a haul truck, etc.) of the system 100 or between such machines 104. In other instances, the communications may be automatically routed without the need for re-transmission by remote personnel.

Figure 2:
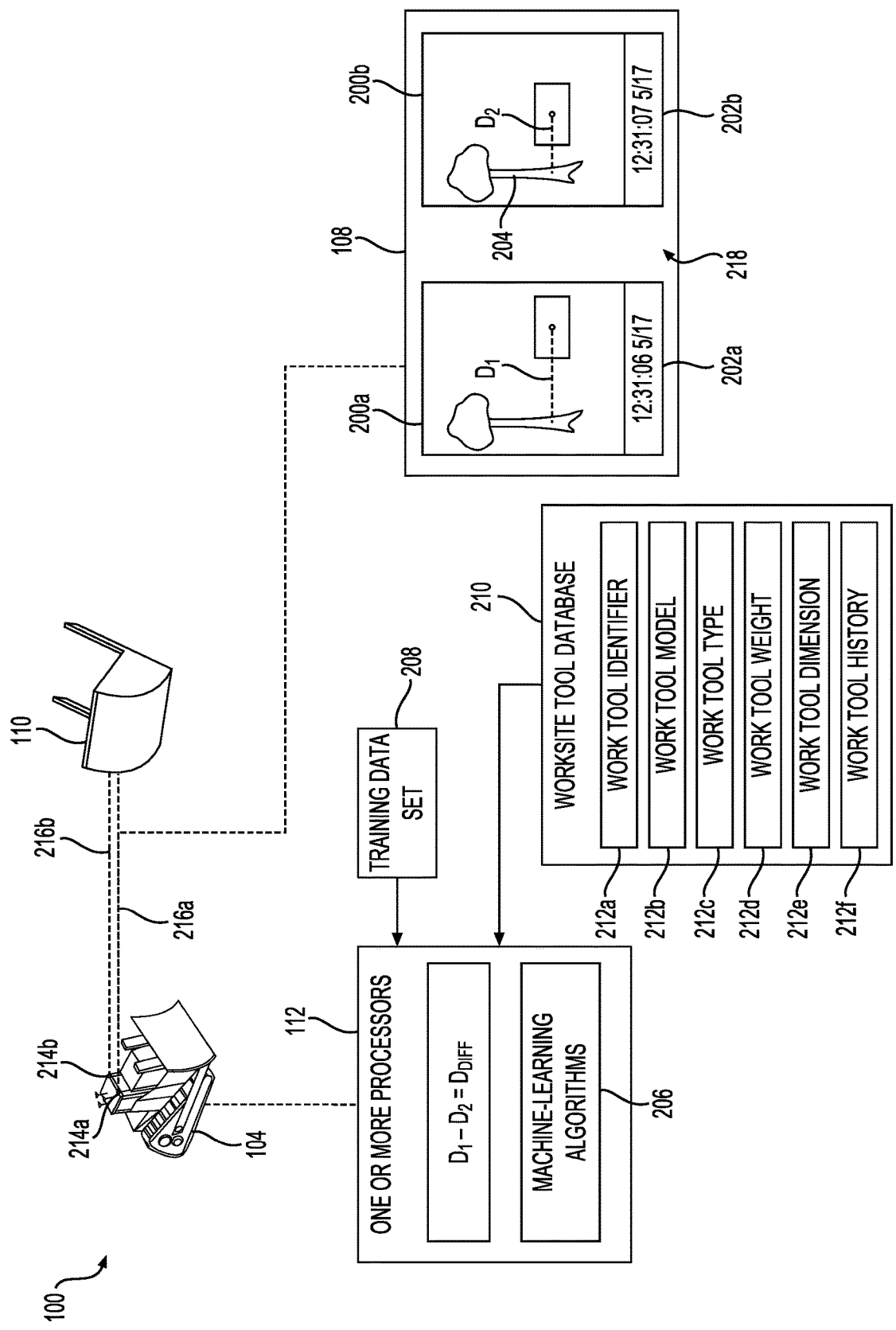
FIG. 2 is another schematic illustration of the system shown in FIG. 1.

FIG. 2 illustrates aspects of the example system 100 described above with respect to FIG. 1 in further detail. Referring to FIG. 2, an example of system 100 may include at least one of the machine(s) 104 (e.g., the first machine 104a, the second machine 104b, etc.), the work tool 110, and the sensor 106 for receiving the image information 108 from the work tool 110. In some examples, the image information 108 may include one or more frames of image data (e.g., collected by a camera), such as a first frame 200a and a second frame 200b.

In some examples, the first frame 200a may be associated with a first timestamp 202a. The first timestamp 202a may indicate a time at which the first frame 200a is generated, for instance, by the sensor 106 and/or is received at the one or more processor(s) 112. The first frame 200a may include data representing the work tool 110 and, in some instances, data representing a background marker 204. For instance, the one or more processor(s) may 112 may determine that a portion of the image information 108 comprising the first frame 200a represents a background object (e.g., a tree, a portion of a building, a stationary machine, or any other object that may contrast against the work tool 110 and/or is positioned behind the work tool 110 relative to the machine(s) 104), and may assign and/or store a tag to the background object identifying the background object as the background marker 204. Upon determining the background marker 204 and identifying the work tool 110 as represented in the first frame 200a, the one or more processor(s) 112 may determine a first distance value $D_1$ between the work tool 110 (e.g., an edge of the work tool 110 and/or a substantially center point of the work tool 110) and the background marker 204 (e.g., an edge of the background marker 204 and/or a substantially center point of the background marker 204).

In some examples, the second frame 200b may be associated with a second timestamp 202b. The second timestamp 202b may indicate a time at which the second frame 200b is generated, for instance, by the sensor 106 and/or is received at the one or more processor(s) 112. The second timestamp 200b may indicate a time after the first timestamp 200a (e.g., with a time difference on the order of milliseconds, seconds, or minutes). The second frame 200b may include data representing the work tool 110 and, in some instances, data representing the background marker 204. For instance, the one or more processor(s) may 112 may access and/or receive the tag identifying the background object as the background marker 204 in the first frame 200a. Upon identifying the background marker 204 (e.g., via the tag) and the work tool 110 as represented in the second frame 200a, the one or more processor(s) 112 may determine a second distance value $D_2$ between the work tool 110 (e.g., the edge of the work tool 110 and/or the substantially center point of the work tool 11) and the background marker 204 (e.g., the edge of the background marker 204 and/or the substantially center point of the background marker 204). The one or more processor(s) 112 may determine (e.g., calculate) a difference $D_{Diff}$ between the first distance value $D_1$ and the second distance value $D_2$. Based at least in part on the difference $D_{Diff}$ and a determination of a travel distance the machine(s) 104 traveled between receiving the first frame 200a and the second frame 200b, the one or more processor(s) 112 may execute one or more trigonometric functions to calculate a separation distance between the work tool 110 and the machine(s) 104. Based at least in part on the separation distance and the first location 116 of the machine(s) 104, the one or more processor(s) 112 may determine the second location 118 (FIG. 1) of the work tool 110.

In some examples, the system 100 may include one or more machine-learning algorithm(s) 206 that may perform image processing and/or recognition operations. In some examples, the machine-learning algorithm(s) 206 may be stored and/or executed at the machine(s) 104, for instance, by the one or more processor(s) 112 that may be carried by the machine(s) 104. The machine-learning algorithm(s) 206 may, in some instances, determine whether, based on the image information 108, one or more tool characteristics 120 may be identified with an associated confidence interval that satisfies a predetermined threshold. Such a predetermined threshold may comprise, for example, a length threshold associated with a length of one or more known work tools, a width threshold associated with a width of one or more known work tools, a height threshold associated with a height of one or more known work tools, a surface color threshold associated with stored color data associated with one or more known work tools, a shape threshold associated with a shape of one or more known tools, and/or any other such threshold or combination thereof. In such examples, determining that one or more confidence intervals associated with the tool characteristic determination satisfy the associated threshold may include determining that the confidence intervals associated with one or more tool characteristics 120 identified from the image information 108 comprise values that are less than or equal to the associated predetermined threshold.

The system 100 may include a training data set 208 utilized by the machine-learning algorithm(s) 206, for instance, to generate improvements to an ability of the machine-learning algorithm(s) 206 to identify particular tool characteristics 120 from the image information 108. In some examples the training data 208 may be stored at the machine(s) 104 and/or retrieved from the machine(s) 104 by the machine-learning algorithm(s) 206. The training data set 208 may include previously-stored image information that has been collected and or stored, for instance, from other of the one or more machines 104. The training data set 208 may include images collected of the work tool 110 from multiple different angles, under different light conditions, and/or partially obstructed. In some instances, the training data set 208 may comprise a plurality of image files that may be large data files of multiple megabytes or gigabytes. In some examples, the training data set 208 may be stored and/or processed at the machine(s) 104 and/or at the worksite 102 rather than transmitting large datafiles to the remote control system 140. In some instances, the machine-learning algorithm(s) 206 may perform one or more image identification operations at the machine(s) 104 and/or at the worksite 102 rather than transmitting large datafiles to the remote control system 140.

In some instances, the system 100, upon determining the tool characteristic 120 and/or determining that the confidence interval associated with the tool characteristic 120 is greater than the predetermined threshold, the one or more processor(s) 112 may determine whether the tool characteristic 120 is stored at a worksite tool database 210. The tool characteristic 120 may comprise one or more of a work tool identifier 212*a*, a work tool model 212*b*, a work tool type 212*c*, a work tool weight 212*d*, a work tool dimension 212*e*, a work tool history 212*f* a length, width, height, depth, volume, orientation color, texture, composition, radiation emission, or combinations thereof. In some examples, the tool characteristic 120 may be determined based on a structure or structural identifier of the work tool 110, for instance, created from a manufacturing process of the work tool 110, such as a molded structure, a cast structure, and/or uniquely identifying wear pattern of the molded structure or cast structure. In some examples, the tool characteristic 120 may be determined based on a symbolic identifier stamped onto, etched, embossed, printed, or otherwise disposed on an exterior surface of the work tool 110, such as a series of letters or numbers, a QR code, a bar code, a logo, etc.

The tool characteristic 120 may comprise the work tool identifier 212*a* that indicates a particular work tool 110, for instance, based on a symbolic identifier (e.g., a number or label) and/or a structural identifier (e.g., a particular pattern of wear or a unique structural feature) that indicates a unique work tool 110 (e.g., "backhoe rear buck #0032" or "Sally") of the one or more work tools 110 at the worksite 102. In some instances, the tool characteristic 120 may comprise the work tool model 212*b* that indicates a product model of the work tool 110 (e.g., "300 MM (12 in) Pin Lock Rear Backhoe Bucket"). In some examples, the tool characteristic 120 may comprise the work tool type 212*c* indicating a category of the work tool 110 (e.g., "loading," "hauling," "digging," "bucket," "coupler," "fork," etc.). In some examples, the tool characteristic 120 may comprise the work tool weight 212*d* indicating a weight of the work tool 110 (e.g., "249.1 U.S. pounds (lbs.)"). In some examples, the tool characteristic 120 may comprise the work tool dimension 212*e* indicating a height, width, length or other aspect of a shape of the work tool 110 (e.g., "Width: 12 inches") In some examples, the tool characteristic 120 may comprise the work tool history 212*f* indicating one or more previous operations and or locations of the work tool 110, such as an amount of time of use (e.g., "48.9 hours"), particular worksite locations of use (e.g., "worksites #1, #2, #3, #5, #8"), a certain amount of a particular type of use (e.g., "130 feet of trench digs" or "3.82 cubic meters of concrete carried"), previous machine uses (e.g., "attached to back hoe #04, attached to back hoe #6), previous dates or times of use (e.g., "Mar. 25, 2019, 13:14:02"), and/or combinations thereof. In some instances, the tool characteristic 120 may be determined via an absence, omission, or otherwise lack of any electronic components attached to the work tool 110 for determining and/or transmitting information related to the second location 118 of the work tool 110 and/or the tool characteristic 120 of the work tool 110, such that the work tool 110 may be referred to as "electronic-less" or "communication-less." In other examples, the work tool 110 may include communication-related electronics (e.g., Wi-Fi, Bluetooth, RFID, etc.) for communicating with the one or more processor(s) 112.

In some examples, the worksite tool database 210 may be stored at a computer-readable storage device carried by the machine(s) 104, a computer-readable storage device at another location at the worksite 102 (e.g., at the local control system at the worksite 102) and/or at the remote control system 140. The worksite tool database 210 may store one or more indicators of one or more work tools 110 and/or one or more tool characteristics 120 of the one or more work tools 110 at the worksite 102. For instance, the worksite tool database 210 may receive information from a worksite plan indicating inventory information of work tools 110 planned, for instance by a construction company or mining company, to be used for the project at the worksite 102. The worksite tool database 210 may receive updated information when work tools 110 are brought to the worksite 102 and may provide recordkeeping of work tools 110 and/or corresponding tool characteristics 120 of the work tools 110 present or expected to be present at the worksite 102. In some instances, the one or more processor(s) 112 may determine whether the tool characteristic 120, determined at least partly from the image information 108, corresponds to information stored at the worksite tool database 210. For instance, upon determining that the work tool identifier 212*a* includes "backhoe rear buck #0032," the one or more processor(s) 112 may access or receive information from the worksite tool database 210 to determine whether the work tool identifier 212*a* of "backhoe rear buck #0032" is stored at the worksite tool database 210 for verification that the work tool 110 associated with the work tool identifier 212*a* "backhoe rear buck #0032" is expected to be present at the worksite 102. Determining that the tool characteristic 120 is stored at the worksite tool database 210 may cause the one or more processor(s) to increase the confidence interval associated with the tool characteristic 120 determination.

In some instances, the sensor 106 may comprise one or more camera, such as a first camera 214*a* and a second camera 214*b*. The first camera 214*a* may receive first image information 216*a* from the work tool 110, and the second camera 214*b* may receive second image information 216*b* from the work tool 110. In some instances, the system 100 may receive the image information 108 from two or more cameras, such as the first camera 214*a* and the second camera 214*b*, so that the system may perform one or more parallax range finding techniques. The system 100 may determine a difference 218 between the first image information 216a and the second image information 216b similar to the technique discussed above regarding the first frame 200a and the second frame 200b. However, rather than determine the separation distance based on the travel distance of the machine(s) 104, the one or more processor(s) 112 may determine the separation distance based on the spacing difference between the first camera 214a and the second camera 214b. In some instances, an angle associated with the first camera 214a and/or the spacing difference between the first camera 214a and the second camera 214b may be associated with the first image information 216a received at the first camera 214a. Similarly, the system 100 may determine the angle associated with the second camera 214b and/or the spacing difference between the first camera 214a and the second camera 214b associated with the second image information 216b. Additionally, the one or more processor(s) 112 may access this information, for instance via the machine-learning algorithm(s) 206, to achieve a high resolution two-dimensional or three-dimensional input for identifying the work tool 110 and/or determining the tool characteristic 120 from the first image information 216a and the second image information 216b.

Figure 3:
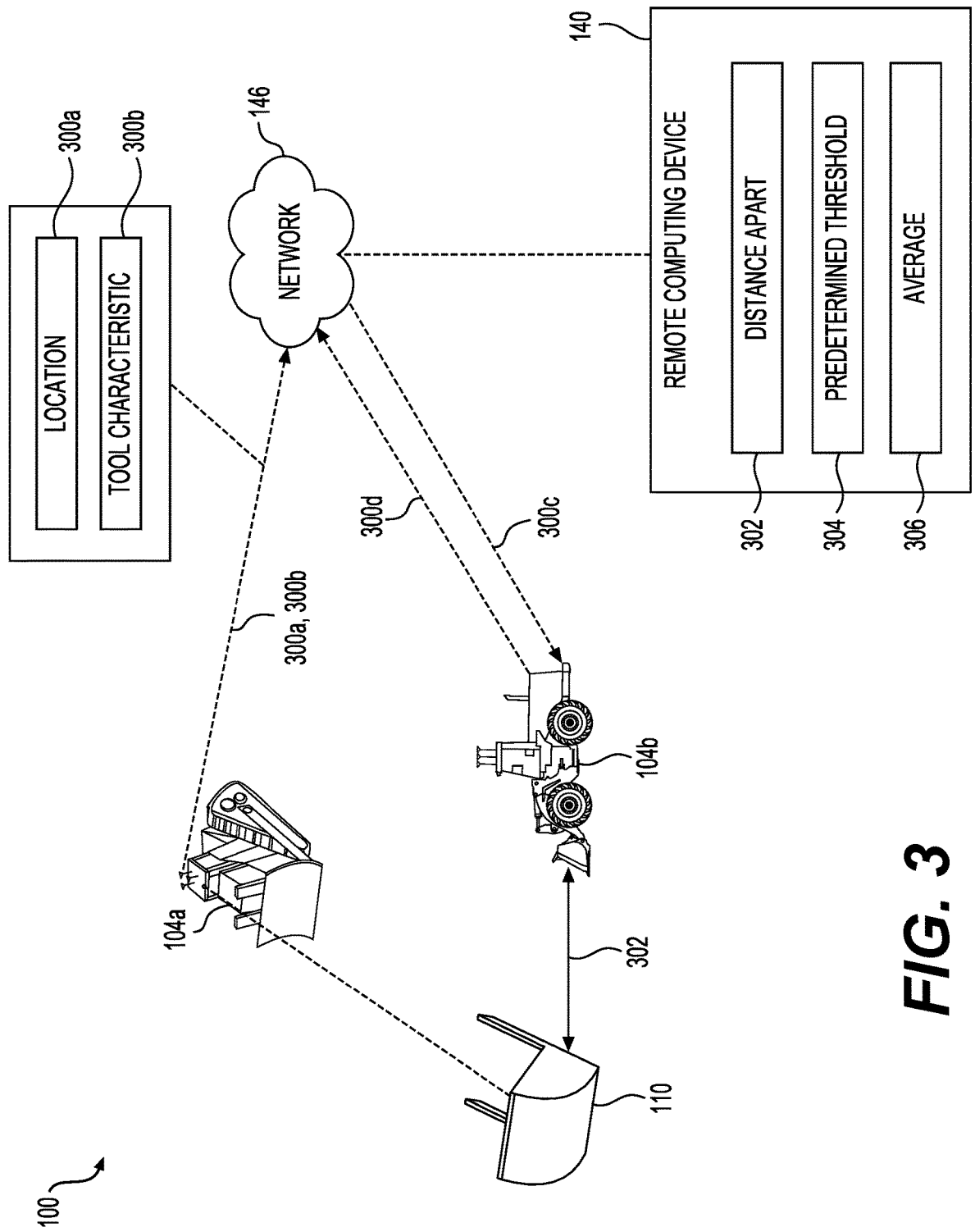
FIG. 3 is another schematic illustration of the system shown in FIG. 1

FIG. 3 illustrates aspects of the example system 100 described above with respect to FIG. 1 in further detail. Referring to FIG. 3, an example of system 100 may include at least the one or more machine(s) 104 (e.g., first machine 104a, the second machine 104b, etc.), the work tool 110 and the remote control system 140, for instance, to perform fleet management operations for the machine(s) 104 and the worksite 102. The transmission(s) 148 may comprise wireless data packets from the communication device 144 (e.g., carried by the machine(s) 104), and indicators included in the transmission(s) 144 may comprise data representing information collected or generated at the worksite 102 (e.g., by the one or more processor(s) 112). The transmission(s) 148 may comprise wireless data packets sent to the communication device 138 from the remote control system 140, which may include indicators of information stored and/or generated at the remote control system 140, such as indicators of the second location 118 of the work tool 110 and/or instructions to change a travel path of the machine(s) 104 from the first travel path 136a to the second travel path 136b, as discussed in greater detail below.

The remote control system 140 may receive information transmitted from the worksite 102 and from multiple other worksites, such as from the machine(s) 104 and/or from the local control system. The first machine(s) 104a may send to the remote control system 140 a transmission 148 including a first indicator 300a representing the second location 118 of the work tool 110 and a second indicator 300b representing the tool characteristic 120 of the work tool 110. The remote control system 140 may receive and store the first indicator 300a and the second indicator 300b and/or data derived from the first indicator 300a and the second indicator 300b at a database of the remote control system 140.

In some examples, the remote control system 140 may send a third indicator 300c indicating the second location 118, for instance, to the second machine(s) 104b, based at least in part on receiving the first indicator 300a and/or the second indicator 300b. The remote control system 140 may send the third indicator 300c based at least partly on receiving location information or travel path information associated with the second machine(s) 104b and determining that the second location 118 represented by the first indicator 300a is within a predetermined threshold distance value from a location or a travel path of the second machine(s) 104(b). In some instances, the remote control system 140 may send the third indicator 300c based at least partly on determining that the second machine(s) 104b is a distance apart 302 from the first machine(s) 104a and/or that the distance apart 302 is less than a predetermined threshold 304 that may be stored at the database of the remote control system 140. In some examples, the second machine(s) 104b may receive the third indicator 300c and may, via the processor(s) 112, execute the second travel parameter 134b that may be included in the third indicator 300c, such that the second machine 104b travels along the second travel path 136b that may be different than the first travel path 136a and may be outside the predetermined threshold 304.

In some examples, the remote control system 140 may receive a fourth indicator 300d from the second machine(s) 104b, from another machine at the worksite 102, from the local control system of the worksite 102, from another remote control system, or from combinations thereof. For instance, the second machine(s) 104b may determine the second location 118 of the work tool 118, in some instances, independently from the first machine(s) 104a determining the second location 118. The second machine(s) 104b (or another machine) may generate and send the transmission 148 to the remote control system 140 including the fourth indicator 300d of the second location 118 generated at the second machine(s) 104b. In some instances, the remote control system 140 may generate an average 306 based on the first indicator 300a of the second location 118 and the fourth indicator 300d of the second location 118, for instance, to generate a higher accuracy determination of the second location 118 of the work tool 110. The average 306 may be based on additional indicators of the second location 118, for instance, from numerous machines, in addition to the first indicator 300a and the fourth indicator 300c. The third indicator 300c of the second location 118 sent from the remote control system 140 may be based on the average 306. In some examples, the third indicator 300c may be sent to the first machine(s) 104a additionally or alternatively to the second machine(s) 104b. The third indicator 300c may be sent to any number of machines 104 at the worksite 102 or at other worksites.

Figure 4:
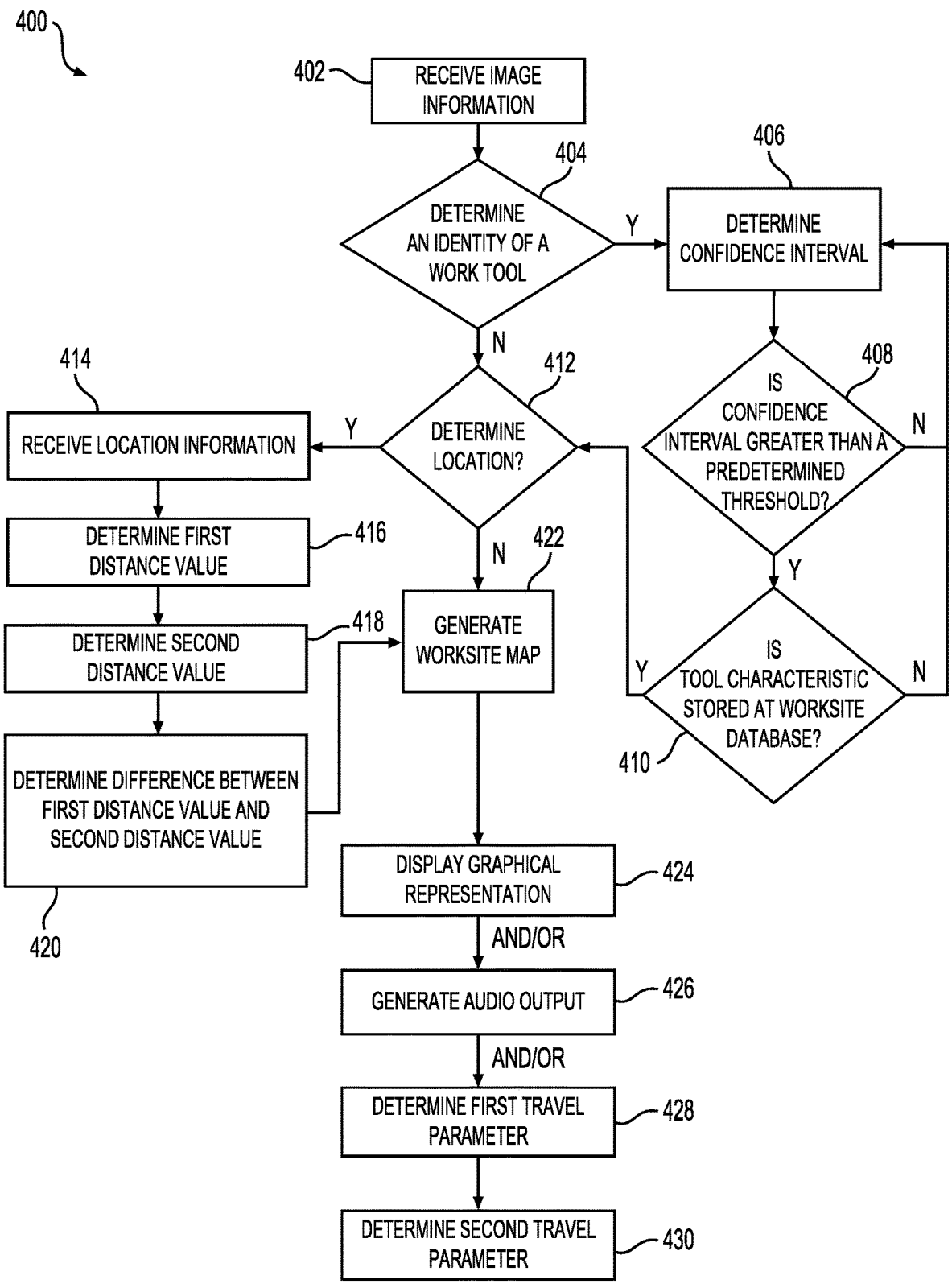
FIG. 4 is a flow chart depicting an example method associated with the system shown in FIGS. 1-3.

FIG. 4 illustrates a flow chart depicting an example method 400 associated with the system 100. The example method 400 is illustrated as a collection of steps in a logical flow diagram, which represents operations that can be implemented in hardware, software, or a combination thereof. In the context of software, the steps represent computer-executable instructions stored in memory. Such instructions may be executed by the one or more processor(s) 112 (e.g., at the worksite 102 and/or carried by the machine(s) 104), the additional processor 142 of the remote control system 140, and/or other components of the system 100 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 400 is described with reference to the system 100, the worksite 102, the one or more machine(s) 104 (e.g., the first machine(s) 104(a), the second machine(s) 104b, etc.), the sensor 106, the image information 108, the work tool 110, the one or more processor(s) 112, and/or other items shown in FIGS. 1-3. In particular, although any part of and/or the entire method 400 may be performed by the one or more processor(s) 112, one or more controller(s) of the machine(s) 104, the additional processor 142 of the remote computing system 140, and/or other components of the system 100, either alone or in combination, unless otherwise specified, the method 400 will be described below with respect to the one or more processor(s) 112 for ease of description.

With reference to FIG. 4, at 402, one or more processors may receive image information 108 that may comprise one or more frames of data (e.g., video frames that may be collected at about 30 frames per second), such as the first frame 200a and the second frame 200b. The image information 108 may comprise audio information that may be determined via SONAR, and/or the image information 108 may comprise information determined by LIDAR. The image information 108 may be received by the sensor 106 that may be carried by the first machine(s) 104(a), by the second machine(s) 104(b), or by another machine. The image information 108 may be received by the sensor 106 that may be fixed to a static location, such as a light post, a fence, a building wall, etc.

At 404, one or more processor(s) may determine an identity of a work tool. For instance, the one or more processor(s) 112 may identify the work tool 110 based at least partly on receiving the image information 108. Identifying the work tool 110 may include determining the tool characteristic 120, such as the work tool identifier 212a, the work tool model 212b, the work tool type 212c, the work tool weight 212d, the work tool dimension 212e, the work tool history 212f, combinations thereof, etc. In some instances, the one or more machine-learning algorithm(s) 206 may perform image processing and/or recognition operations. The machine-learning algorithm(s) 206 may be stored and/or executed at the machine(s) 104, for instance, by the one or more processor(s) 112 that may be carried by the machine(s) 104. The machine-learning algorithm(s) 206 may compare the image information 108 to information based on the training data set 208 to determine the tool characteristic 120 and/or identify the work tool 110.

At 406, one or more processor(s) may determine a confidence interval. For instance, calculations performed by the one or more processor(s) 112 (e.g., via the machine-learning algorithm(s) 206) to determine the tool characteristic 120 from the image information 108 may comprise statistical calculations that include a confidence interval associated with the results of the statistical calculations. For instance, a 99% confidence interval may indicate a 99% certainty associated with the tool characteristic 120 determination.

At 408, one or more processor(s) may determine whether (e.g., if) a confidence interval is greater than a predetermined threshold. For instance, the one or more processor(s) 112 may receive the predetermined threshold from a database at the machine(s) 104, at the worksite 102, and/or at the remote control system 140. The predetermined threshold may be associated with a particular image processing technique, for instance, performed by the machine-learning algorithm(s) 206. The one or more processor(s) 112 may determine the tool characteristic 120 based at least partly on comparing the confidence interval to the predetermined threshold to determine if the confidence interval is greater than the predetermined threshold or less than the predetermined threshold. For instance, the one or more processor(s) 112 may determine the tool characteristic 120 based on determining that the confidence interval is greater than the predetermined threshold.

At 410, one or more processor(s) may determine whether (e.g., if) a tool characteristic is stored at a worksite tool database. For instance, the worksite tool database 210 may be stored at a computer-readable storage device carried by the machine(s) 104, a computer-readable storage device at another location at the worksite 102 (e.g., at a local control system at the worksite 102) and/or at the remote control system 140. The worksite tool database 210 may store one or more indicators of one or more work tools 110 and/or one or more tool characteristics 120 of the one or more work tools 110 at the worksite 102. For instance, the worksite tool database 210 may receive information from a worksite plan indicating inventory information of work tools 110 planned, for instance by a construction company or mining company, to be used for the project at the worksite 102. The worksite tool database 210 may receive updated information when work tools 110 are brought to the worksite 102 and may provide recordkeeping of work tools 110 and/or corresponding tool characteristics 120 of the work tools 110 present or expected to be present at the worksite 102. In some instances, the one or more processor(s) 112 may determine whether the tool characteristic 120, determined at least partly from the image information 108, corresponds to information stored at the worksite tool database 210. For instance, upon determining the work tool identifier 212a includes "backhoe rear buck #0032," the one or more processor(s) 112 may access or receive information from the worksite tool database 210 to determine whether the work tool identifier 212a of "backhoe rear buck #0032" is stored at the worksite tool database 210 for verification that the work tool 110 associated with the work tool identifier 212 "backhoe rear buck #0032" is expected to be present at the worksite 102. Determining that the tool characteristic 120 is stored at the worksite tool database 210 may cause the one or more processor(s) to increase the confidence interval associated with the tool characteristic 120.

At 412, one or more processor(s) may determine a location. For instance, the one or more processor(s) 112 may execute one or more operations to determine the second location 118 of the work tool 110 based at least partly on receiving the image information 108 and/or the first location 116 of the machine(s) 104. Upon determining to execute location determining operations at step 412, the one or more processor(s) 112 may, in some examples, perform steps 414-420.

At 414, one or more processor(s) may receive location information. For instance, the one or more processor(s) 112 may receive the image information 108 that may include the first frame 200a and the second frame 200b. In some examples, the first frame 200a may be associated with the first timestamp 202a indicating a time at which the first frame 200a is generated, for instance, by the sensor 106 and/or is received at the one or more processor(s) 112. The first frame 200a may include data representing the work tool 110 and, in some instances, data representing the background marker 204. For instance, the one or more processor(s) may 112 may determine that a portion of the image information 108 comprising the first frame 200a represents a background object (e.g., a tree, a portion of a building, a stationary machine, or any other object that may contrast against the work tool 110 and/or is positioned behind the work tool 110 relative to the machine(s) 104), and may assign and store a tag to the background object identifying the background object as the background marker 204.

At 416, one or more processor(s) may determine a first distance value. For instance, upon determining the background marker 204 and identifying the work tool 110 as represented in the first frame 200a, the one or more processor(s) 112 may determine the first distance value $D_1$ between the work tool 110 (e.g., the edge of the work tool 110 and/or the substantially center point of the work tool 110) and the background marker 204 (e.g., the edge of the background marker 204 and/or the substantially center point of the background marker 204).

At 418, one or more processor(s) may determine a second distance value. For instance, the second frame 200b associated with the second timestamp 202b indicating the time after the first timestamp 200a may include data representing the work tool 110 and, in some instances, data representing the background marker 204. For instance, the one or more processor(s) 112 may access and/or receive the tag identifying the background object as the background marker 204 in the first frame 200a. Upon identifying the background marker 204 and the work tool 110 as represented in the second frame 200a, the one or more processor(s) 112 may determine the second distance value $D_2$ between the work tool 110 (e.g., the edge of the work tool 110 and/or the substantially center point of the work tool 11) and the background marker 204 (e.g., the edge of the background marker 204 and/or the substantially center point of the background marker 204).

At 420, one or more processor(s) may determine a difference between the first distance value and the second distance value. For instance, the one or more processor(s) 112 may determine (e.g., calculate) the difference $D_{Diff}$ between the first distance value $D_1$ and the second distance value $D_2$. Based at least in part on the difference $D_{Diff}$ and a determination of a travel distance the machine(s) 104 traveled between receiving the first frame 200a and the second frame 200b, the one or more processor(s) 112 may execute one or more trigonometric functions to calculate a separation distance between the work tool 110 and the machine(s) 104. Based at least in part on the separation distance and the first location 116 of the machine(s) 104, the one or more processor(s) 112 may determine the second location 118 of the work tool 110 (e.g., step 412).

At 422, one or more processor(s) may generate a worksite map. For instance, the one or more processor(s) 112 may generate the worksite map 122 identifying the work tool 110, for instance, via the tool characteristic 120 (e.g., the work tool identifier 212a), and indicating the second location 118 of the work tool 110 at the worksite 102.

At 424, one or more processor(s) may display a graphical representation. For instance, the one or more processor(s) 112 may display the worksite map 120 at the display 124 carried by the machine(s) 104 and/or located at the worksite 102. The worksite map 120 may include the visual representation of the boundary 128 positioned at least partially around the second location 118.

At step 426, one or more processor(s) may generate an audio output. For instance, the one or more processor(s) 112 may control the audio speaker 130 located at the worksite 102 and/or carried by the machine(s) 104. The one or more processor(s) 112 may cause the audio speaker 130 to generate the audio output 132 at least partially based on the image information 108 and indicating at least the proximity of the machine(s) 104 to the second location 118 of the work tool 110.

At 428, one or more processor(s) may determine a first travel parameter. For instance, the one or more processor(s) 112 may determine the first travel parameter 134a that may cause the machine(s) 104 to travel along the first travel path 136a at the worksite 102.

At 430, one or more processor(s) may determine a second travel parameter. For instance, the one or more processor(s) 112 may determine the second travel parameter 134b at least partly based on receiving the image information 108 (e.g., at step 402), determining the second location 118 (e.g., at steps 412-420), and/or generating the worksite map 122 (e.g., at step 422). Determining the second travel parameter 134b may cause the machine(s) 104 to travel along a second travel path 136b that may be different than the first travel path 136a, for instance, to avoid a collision of the machine(s) 104 with the work tool 110.

Figure 5:
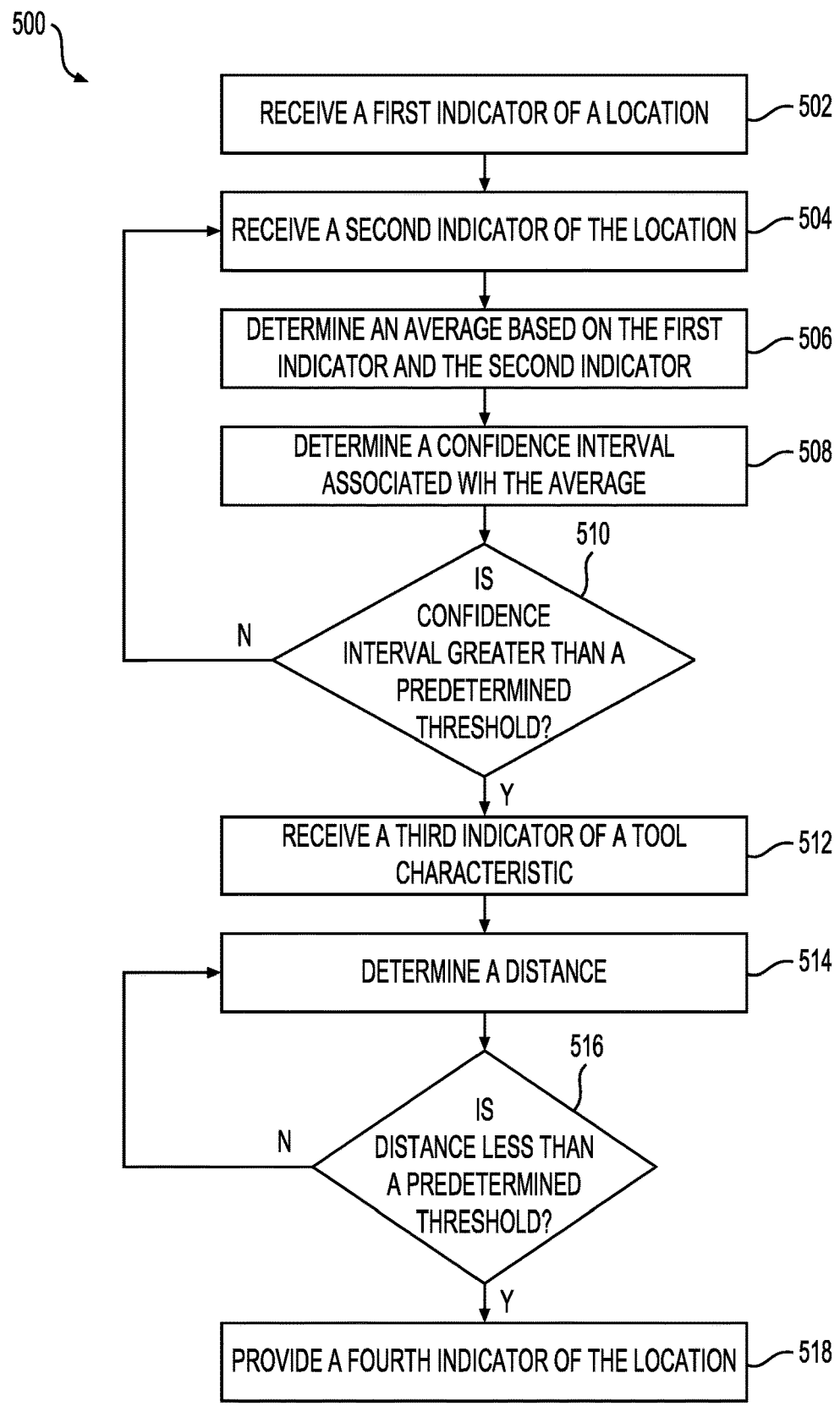
FIG. 5 is a flow chart depicting another example method associated with the system shown in FIGS. 1-3.

FIG. 5 illustrates a flow chart depicting an example method 500 associated with the system 100. The example method 500 is illustrated as a collection of steps in a logical flow diagram, which represents operations that can be implemented in hardware, software, or a combination thereof. In the context of software, the steps represent computer-executable instructions stored in memory. Such instructions may be executed by, for example, one or more processor(s) 112 (e.g., at the worksite 102 and/or carried by the machine(s) 104), the additional processor 142 of the remote control system 140, and/or other components of the system 100 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. Any of the steps of the method 500 may form a part of the method 400, and any of the steps of the method 400 may form a part of the method 500. For discussion purposes, and unless otherwise specified, the method 400 is described with reference to the system 100, the worksite 102, the one or more machine(s) 104 (e.g., the first machine(s) 104(a), the second machine(s) 104b, etc.), the sensor 106, the image information 108, the work tool 110, the one or more processor(s) 112, and/or other items shown in FIGS. 1-3. In particular, although any part of and/or the entire method 500 may be performed by the one or more processor(s) 112, one or more controller(s) of the machine(s) 104, the additional processor 142 of the remote computing system 140, and/or other components of the system 100, either alone or in combination, unless otherwise specified, the method 500 will be described below with respect to the one or more processor(s) 112 for ease of description.

With reference to FIG. 5, at 502 one or more processors may receive a first indicator of a location. For instance, the first machine(s) 104a may send to the remote control system 140 the transmission 148 including the first indicator 300a representing the second location 118 of the work tool 110. The remote control system 140 may receive and store the first indicator 300a at the database of the remote control system 140.

At 504, one or more processor(s) may receive a second indicator of the location. For instance, the one or more processor(s) 112 may receive the fourth indicator 300d from the second machine(s) 104b, from another machine at the worksite 102, from the local control system of the worksite 102, from the remote control system 140, another remote control system, or from combinations thereof. For instance, the second machine(s) 104b may determine the second location 118 of the work tool 118 at the second machine(s) 104b and, in some instances, independently from the first machine(s) 104a determining the second location 118. The second machine(s) 104b (or another machine) may generate and send the transmission 148 to the remote control system 140 including the fourth indicator 300d of the second location 118 generated at the second machine(s) 104b.

At 506, one or more processor(s) may determine an average based at least partly on the first indicator and the second indicator. For instance, the remote control system 140 may generate the average 306 based on the first indicator 300a of the second location 118 and the fourth indicator 300d of the second location 118, for instance, to generate a higher accuracy determination of the second location 118 of the work tool 110. The average 306 may be based on additional indicators of the second location 118, for instance, from numerous machines, in addition to the first indicator 300a and the fourth indicator 300c.

At 508, one or more processor(s) may determine a confidence interval associated with the average. For instance, upon determining the average 306, the one or more processor(s) 112 may determine a confidence interval associated with the average 306, such as based on a standard deviation of a Gaussian distribution associated with the average 306.

At 510, one or more processor(s) may determine whether (e.g., if) the confidence interval is greater than a predetermined threshold. For instance, the system 100 may store the confidence interval associated with a degree of certainty that location information aggregated from numerous sources (e.g., machine(s) 104) is sufficiently accurate to rebroadcast to machine(s) 104 at the worksite 102. Accordingly, the one or more processor(s) may compare the confidence interval (e.g., generate at step 508) to the predetermined threshold, for instance, to determine whether to send the fourth indicator of Step 518.

At 512, one or more processor(s) may receive a third indicator of a tool characteristic. For instance, the transmission 148 from the first machine(s) 104a of the first indicator 300a may also include the second indicator 300b of the tool characteristic 120 of the work tool, for instance, as determined by the one or more processor(s) 112 at the machine(s) 104 and/or at the worksite 102. In some examples, the second indicator 300b of the tool characteristic 120 may be received in a separate transmission 148 than the first indicator 300a.

At 514, one or more processor(s) may determine a distance. For instance, the one or more processor(s) 112 may determine that the first location 116 of the first machine(s) 104a is the distance apart 302 from the second machine(s) 104b. In some examples, the one or more processor(s) 112 may determine a distance between the second location 118 of the work tool 110 and a travel path of the second machine(s) 104b (e.g., travel path 136a).

At 516, one or more processor(s) may determine whether the distance is less than a predetermined threshold. For instance, the predetermined threshold may be a value stored at the worksite 102 (e.g., at the machine(s) 104 and/or at the local control system) and/or at the remote control system 140. The one or more processor(s) 112 may receive the predetermined threshold and compare the distance (e.g., the distance apart 302 determined at step 514) to the predetermined threshold to determine if the distance is greater or less than the predetermined threshold.

At 518, one or more processor(s) may provide a fourth indicator of the location. For instance, the additional processor 142 of the remote computing device 140 may generate and/or send the third indicator 300c indicating the second location 118 to the second machine(s) 104b. The remote control system 140 may determine to send the third indicator 300c indicating the second location 118 to the second machine(s) 104b based at least in part on receiving the first indicator 300a and/or the second indicator 300b. For instance, the remote control system 140 may send the third indicator 300c based at least partly on receiving location information or travel path information associated with the second machine(s) 104b, and determining that the second location 118 represented by the first indicator 300a is within a predetermined threshold distance value from a location or a travel path of the second machine(s) 104(b). In some instances, the remote control system 140 may send the third indicator 300c based at least partly on determining that the second machine(s) 104b is the distance apart 302 from the first machine(s) 104a and/or that the distance apart 302 is less than the predetermined threshold 304 stored at the database of the remote control system 140. The third indicator 300c of the second location 118 sent from the remote control system 140 may be based on the average 306. In some examples, the third indicator 300c may be sent to the first machine(s) 104a additionally or alternatively to the second machine(s) 104b. The third indicator 300c may be sent to any number of machines 104 at the worksite 102 or at other worksites.

INDUSTRIAL APPLICABILITY

The present disclosure describes systems and methods for controlling various machines, sensors, and/or other components of the system 100 employed at a worksite 102. Such systems and methods may, in some examples, be used to more efficiently coordinate activities of the one or more machine(s) 104 and other components of the system 100 during excavation, mining, construction, paving, and/or other operations at the worksite 102 that use the one or more work tools 110. The systems and methods disclosed herein may, in some examples, assist in managing locations of work tools 110 for improved safety (e.g., to avoid collisions between work tool(s) 110 and machine(s) 104, for instance, that may be operating autonomously), operational efficiency (e.g., by determining shortest best-fit travel paths based at least partly on the locations, such as the second location 118, of one or more work tool(s) 110), and inventory recordkeeping (e.g., by providing an updated worksite tool database 210).

Moreover, systems and methods discussed herein may provide the disclosed benefits for a wide variety of work tools 110 that may be electronic-less or communication-less. For instance, the systems and methods may determine one or more tool characteristics 120 (e.g., such as the work tool identifier 212a) via the sensor 106, such as one or more cameras that may be directed at the work tool 110. The sensor 106 may determine the tool characteristic 120 based on light (visible light, natural sunlight, temporary worksite lighting, etc.) reflecting from the surface 138 of the work tool 110. As such, the work tool 110 may omit specialized electronics or communication components disposed on the work tool 110 for communicating with other components of the system 100 (e.g., the one or more processor(s) 112) because the shape, itself, of the work tool 110 may provide sufficient information, for instance, via the light reflecting off the surface 138, to determine the tool characteristic 120.

As a result, the systems and methods of the present disclosure may assist in reducing the time and resources required to determine the tool characteristic 120 (e.g., identity) and second location 118 of the work tool, thereby improving the efficiency of the system 100. The systems and methods may provide additional flexibility to add and/or remove work tools 110 to and from the worksite 102 without requiring installation of additional electronic components or communication components onto the work tool 110. The systems and methods of the present disclosure may also reduce the risk of damage to the one or more machine(s) 104, and/or work tools 110 of the system 100 during operation by reducing the risk of collisions and improving safety. As a result, the systems and methods of the present disclosure may reduce downtime, increase productivity of the system 100, and minimize expenses associated with machine(s) 104 and work tool 110 repair.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
   receiving image information with one or more processor(s) and from a sensor disposed at a worksite;
   determining, by the one or more processor(s), an identity of a work tool disposed at the worksite based at least partly on the image information;
   receiving location information with the one or more processor(s), the location information indicating a first sensor location at the worksite;
   determining a work tool location at the worksite based at least partly on the location information, wherein determining the work tool location comprises:
      determining, by the one or more processor(s), from a first frame of the image information obtained at the first sensor location, a first distance between the work tool and a background marker,
      causing the sensor to change from the first sensor location to a second sensor location,
      determining, by the one or more processor(s), from a second frame of the image information obtained at the second sensor location, a second distance between the work tool and the background marker, and
      calculating, by the one or more processor(s), a difference between the first distance and the second distance;
   generating a worksite map with the one or more processor(s), the worksite map identifying the work tool and indicating the work tool location at the worksite based at least in part on the difference; and
   at least one of providing the worksite map to an additional processor and causing the worksite map to be rendered via a display.

2. The method of claim 1, wherein the sensor is carried by a machine at the worksite.

3. The method of claim 2, wherein the machine comprises a first machine, and causing the worksite map to be rendered comprises displaying the worksite map at a monitor carried by a second machine.

4. The method of claim 2, wherein the machine comprises a first machine, the method further comprising causing an audio speaker carried by a second machine at the worksite to generate an audio output indicating the work tool location.

5. The method of claim 2, further comprising:
   causing, with the one or more processor(s), the machine to travel along a first path, based at least partly on a first travel parameter;
   determining a second travel parameter, based at least partly on determining the second location of the work tool at the worksite; and
   causing, with the one or more processor(s), the machine to travel along a second path that is different than the first path, based at least partly on the second travel parameter.

6. The method of claim 1, further comprising determining, with the one or more processor(s) and based at least partly on the image information, a tool characteristic associated with the work tool, and wherein causing the worksite map to be rendered includes outputting at least one of a graphical representation or an audio output of the tool characteristic.

7. A system, comprising:
   a machine adapted to perform operations at a worksite;
   a sensor adapted to
      capture a first frame of image information associated with the worksite at a first sensor location, and
      be relocated to capture a second frame of the image information at a second sensor location; and
   one or more processor(s) adapted to:
      determine a tool characteristic, associated with a work tool disposed at the worksite, based at least partly on the image information;
      determine a work tool location, wherein determining the work tool location comprises to:
         determine, from the first frame captured at the first sensor location, a first distance between the work tool and an object,
         determine, from the second frame captured after relocation of the sensor to the second sensor location, a second distance between the work tool and the object, and
         calculate a difference between the first distance and the second distance;
      generate a worksite map identifying the work tool and indicating the work tool location based at least in part on the difference; and
      at least one of providing the worksite map to an additional processor and causing the worksite map to be rendered via a display.

8. The system of claim 7, wherein the first frame is associated with a first timestamp and the second frame is associated with a second timestamp that is different than the first timestamp, and wherein the timestamps are included in metadata provided by the sensor.

9. The system of claim 8, wherein the one or more processor(s) are adapted to determine the work tool location based at least in part on a path of travel of the machine.

10. The system of claim 7, wherein the one or more processor(s) are adapted to determine the tool characteristic based at least in part on:
    a machine-learning algorithm executable at the machine, the machine-learning algorithm being configured to determine a confidence interval associated with the tool characteristic based at least in part on a training data set stored at the machine.

11. The system of claim 10, wherein the one or more processor(s) are further adapted to:
    determine that the tool characteristic is stored in a worksite tool database, the worksite database storing information indicating one or more work tools present at the worksite.

12. The system of claim 11, wherein the tool characteristic comprises at least one of a work tool identifier, a work tool model, a work tool type, a work tool weight, a work tool dimension, or a work tool history.

13. The system of claim 12, wherein the one or more processor(s) are carried by the machine.

14. The system of claim 7, wherein the sensor comprises a first camera carried by the machine and the image information comprises first image information, the system further comprising a second camera carried by the machine, wherein
    determining the work tool location includes determining a difference between the first image information and second image information determined by the second camera.

15. The system of claim 7, wherein the image information reflects from a surface of the work tool.

\* \* \* \* \*